(12) United States Patent
Richard et al.

(10) Patent No.: US 8,039,152 B2
(45) Date of Patent: Oct. 18, 2011

(54) TIN IN AN ACTIVE SUPPORT MATRIX

(75) Inventors: Monique Richard, Ann Arbor, MI (US);
Kimber L. Stamm, Ann Arbor, MI
(US); Liya Wang, Ann Arbor, MI (US);
Shih-Chieh Yin, Ann Arbor, MI (US);
Pu Zhang, Ann Arbor, MI (US); Suresh
Mani, Ann Arbor, MI (US); Junqing
Ma, Ann Arbor, MI (US); Brian
Glomski, Ypsilanti, MI (US)

(73) Assignees: Toyota Motor Engineering &
Manufacturing North America, Inc.,
Erlanger, KY (US); T/J Technologies,
Inc., Ann Arbor, MI (US)

( * ) Notice: Subject to any disclaimer, the term of this
patent is extended or adjusted under 35
U.S.C. 154(b) by 1173 days.

(21) Appl. No.: 11/695,975

(22) Filed: Apr. 3, 2007

(65) Prior Publication Data
US 2008/0248393 A1    Oct. 9, 2008

(51) Int. Cl.
H01M 4/62    (2006.01)
H01M 4/13    (2010.01)

(52) U.S. Cl. ............. 429/232; 429/231.1; 429/231.95

(58) Field of Classification Search .......... 429/101,
429/217, 218.1, 231.1, 231.95, 231, 232
See application file for complete search history.

(56) References Cited

U.S. PATENT DOCUMENTS

| | | | |
|---|---|---|---|
| 5,702,845 A | 12/1997 | Kawakami et al. | |
| 5,795,679 A | 8/1998 | Kawakami et al. | |
| 5,834,139 A | 11/1998 | Shodai et al. | |
| 6,037,095 A | 3/2000 | Miyasaka | |
| 6,432,581 B1 | 8/2002 | Amatucci et al. | |
| 6,524,744 B1 | 2/2003 | Clerc et al. | |
| 6,558,841 B1 | 5/2003 | Nakagiri et al. | |
| 6,566,011 B1 | 5/2003 | Takeda et al. | |
| 6,599,662 B1 | 7/2003 | Chiang et al. | |
| 6,605,386 B1 | 8/2003 | Kasamatsu et al. | |
| 6,749,648 B1 * | 6/2004 | Kumar et al. .............. | 29/623.1 |
| 6,761,998 B2 | 7/2004 | Sato et al. | |
| 6,890,685 B2 | 5/2005 | Yamamoto et al. | |
| 7,087,348 B2 | 8/2006 | Holman et al. | |
| 2003/0215717 A1 * | 11/2003 | Miyaki ..................... | 429/232 |
| 2004/0131934 A1 | 7/2004 | Sugnaux et al. | |
| 2004/0197654 A1 | 10/2004 | Barker et al. | |
| 2005/0191550 A1 | 9/2005 | Satoh et al. | |
| 2006/0019115 A1 | 1/2006 | Wang et al. | |
| 2006/0057463 A1 | 3/2006 | Gao et al. | |
| 2006/0083986 A1 * | 4/2006 | Li et al. .................... | 429/218.1 |
| 2006/0102455 A1 | 5/2006 | Chiang et al. | |
| 2006/0127773 A1 | 6/2006 | Kawakami et al. | |

FOREIGN PATENT DOCUMENTS

WO    WO-2005/048381    5/2005

* cited by examiner

*Primary Examiner* — Patrick Joseph Ryan
*Assistant Examiner* — Muhammad Siddiquee
(74) *Attorney, Agent, or Firm* — Gifford, Krass, Sprinkle, Anderson & Citkowski, P.C.

(57) ABSTRACT

An anode material made from nanoparticles, said anode material including a homogeneous mixture of lithium-alloying nanoparticles with active support matrix nanoparticles, is provided. The active support matrix nanoparticle is a compound that participates in the conversion reaction of the lithium battery. The compound is preferably a transition metal compound, with said compound including a nitride, carbide, oxide or combination thereof. An electrode manufactured from the anode material preferably has a porosity of between 5 and 80% and more preferably has a porosity between 10 and 50%. The anode material nanoparticles preferably have a mean linear dimension of between 2 and 500 nanometers, and more preferably have a mean linear dimension of between 2 and 50 nanometers.

25 Claims, 3 Drawing Sheets

Current collector

TIN IN AN ACTIVE SUPPORT MATRIX

FIELD OF THE INVENTION

The present invention relates to a lithium-ion battery, in particular to a high performance anode material for a lithium-ion battery.

BACKGROUND OF THE INVENTION

The energy requirements for batteries are continually increasing, while constraints on volume and mass continue to be present. Further, the demand for safe, low cost and environmentally friendly materials is increasing. These demands and battery specifications cannot be met using traditional lithium-ion battery chemistries. Although lithium-ion batteries have long been optimized and have demonstrated stable energies, these systems are limited by the amount of lithium that can be reversibly inserted and removed from the battery's active material structure.

The requirements for greater performance, safety, low cost and environmentally friendly materials can only be achieved through the development of new battery materials. Researchers have proposed the replacement of the carbon-based anode with tin. Tin alloys with lithium during the charging of the battery. The lithium-tin alloy forms a maximum concentration of 4.4 lithium atoms per tin atom, a concentration which equals a capacity of 993 mAh/g. A traditional carbon-based anode has a theoretical capacity of 372 mAh/g. Therefore, the replacement of traditional carbon-based anode batteries with tin-based anode batteries could result in higher energy capabilities.

Research has demonstrated that there are two main issues with the use of a tin-based anode. The first is a poor cycle life and the second is a poor utilization of the tin. A poor cycle life is defined as poor retention of battery energy as a function of the number of charge-discharge cycles. Researchers have taken two approaches to solving these problems. First, by forming an intermetallic compound of tin and at least one other metal, and second, by adding a non-electrochemically active material to the anode composite. However, the prior research has failed to address the fundamental causes of the poor performance of lithium-tin batteries, which are: 1) a large volume expansion of the tin-lithium particles resulting from the alloying of lithium with tin on charge; and 2) the breaking apart of tin agglomerates during the above-stated volume expansion. The volume expansion results in separation of the tin particles from the matrix during subsequent cycles and breaking of tin agglomerates results in fine particles with exposed fresh surface area. This fresh surface area is not in contact with the matrix, and thus like the separation of tin particles from the matrix, results in decrease in battery capacity.

The use of expansion accommodation pores to properly account for the volume expansion of lithiated lithium-alloying particles has been disclosed in U.S. application Ser. No. 11/463,394, incorporated in its entirety herein by reference. However, use of the matrix to participate in the electrochemical reaction of a battery, where said nano-sized matrix is homogeneously mixed with nano-size tin particles, has not been properly addressed.

SUMMARY OF THE INVENTION

An anode material made from nanoparticles, said anode material including a homogeneous mixture of lithium-alloying nanoparticles and active support matrix nanoparticles, is provided. The nano-sized particles of the active support matrix includes a compound that undergoes the so-called 'conversion' mechanism (instead of alloying or intercalation) on reaction with lithium, as described in "Particle Size Effects on the Electrochemical Performance of Copper Oxides toward Lithium," Journal of the Electrochemical Society, Grugeon, Laruelle, Herrera-Urbina, Dupont, Poizot, and Tarascon, 148 (4), pp. A285 (2001). The compound preferably contains a transition metal, illustratively including cobalt, copper, iron, nickel or manganese, and more preferably the compound is a transition metal-oxide, -nitride, -carbide, -sulfide and combinations thereof—for example copper oxide (CuO). On reaction with lithium, the nano-sized particles of the active support matrix undergoes the conversion reaction with the end products including the transition metal plus a lithium-oxide, -nitride, -carbide or -sulfide. For example, in the case of a CuO active support matrix, the conversion reaction could be:

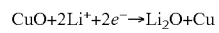

$$CuO + 2Li^+ + 2e^- \rightarrow Li_2O + Cu$$

An electrode manufactured from the anode material preferably has a porosity of between 5 and 80% and more preferably has porosity between 10 and 50%. The anode material nanoparticles preferably have a mean linear dimension of between 2 and 500 nanometers, and more preferably have a mean linear dimension of between 2 and 50 nanometers.

DETAILED DESCRIPTION OF THE PREFERRED EMBODIMENTS

Figure 1:
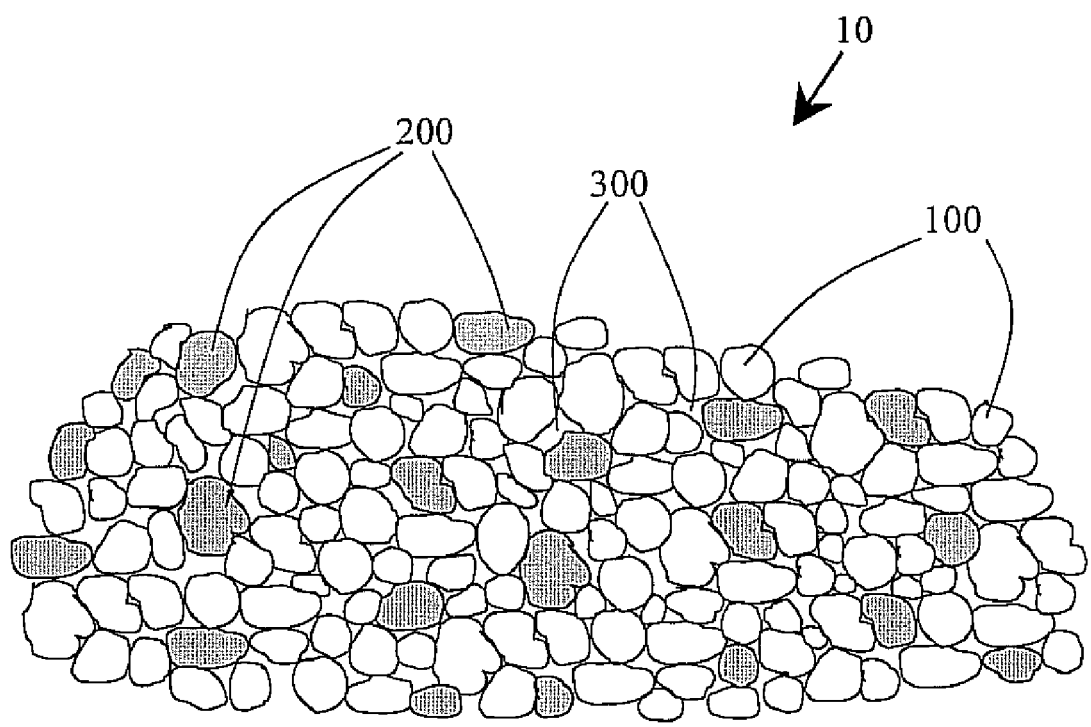
FIG. 1 illustrates an anode material in accordance with a first embodiment of the present invention.

In accordance with a first embodiment of the present invention, FIG. 1 illustrates a high performance anode material 10 in an uncharged state. The anode material 10 includes a plurality of active support matrix nanoparticles 100 and a plurality of lithium-alloying nanoparticles 200. Preferably, the matrix nanoparticles 100 and the lithium-alloying nanoparticles 200 are homogenously admixed together. A porosity 300 is typically present between the material nanoparticles 100 and 200 and a void volume is defined by the total porosity within the anode material 10.

Nanoparticles or nanosized particles are herein defined for the purposes of the present invention as microscopic particles with diameters measured in nanometers (nm) and with at least one measurement of the diameter less than or equal to 999 nanometers. The nano-sized particles of the active support matrix includes a compound that undergoes the so-called 'conversion' mechanism (instead of alloying or intercalation) on reaction with lithium, as described in "Particle Size Effects on the Electrochemical Performance of Copper Oxides toward Lithium," Journal of the Electrochemical Society, Grugeon, Laruelle, Herrera-Urbina, Dupont, Poizot, and Tarascon, 148 (4), pp. A285 (2001).

The compound preferably contains a transition metal, illustratively including cobalt, copper, iron, nickel or manganese, and more preferably the compound is a transition metal-oxide, -nitride, -carbide, -sulfide and combinations thereof— for example copper oxide (CuO). On reaction with lithium, the nano-sized particles of the active support matrix undergoes the conversion reaction with the end products including the transition metal plus a lithium-oxide, -nitride, -carbide or -sulfide. For example, in the case of a CuO active support matrix, the conversion reaction could be:

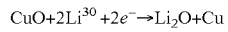

$$CuO + 2Li^{30} + 2e^- \rightarrow Li_2O + Cu$$

The electrochemical and thermal properties of the active support matrix nanoparticles 100, illustratively including voltage, capacity, conductivity and combinations thereof are adjusted by altering the process parameters and/or the chemical composition of said nanoparticles.

The lithium-alloying nanoparticles 200 can be any metal or compound that alloys with lithium, illustratively including tin, silicon, germanium, lead, antimony, aluminum, tin alloys and silicon alloys. For illustrative purposes only compounds include multicomponent (binary, ternary, etc.) alloy systems of tin and silicon alloys include multicomponent (binary, ternary, etc.) alloy systems of silicon. In addition, the lithium-alloying nanoparticles 200 are preferably crystalline nanoparticles, wherein crystalline is defined as a material exhibiting long-range crystallographic order. In the alternative, the lithium-alloying nanoparticles 200 are amorphous.

Although the active support matrix nanoparticles 100 and the lithium-alloying nanoparticles 200 shown in FIG. 1 are representative of non-spherical particles, the anode material nanoparticles can be spherical or any non-spherical or polyhedron shape, illustratively including spheroids and polyhedrons. In addition, the lithium-alloying nanoparticles 200 shown in FIG. 1 represent non-lithiated particles. Non-lithiated particles, also known as unlithiated particles, are defined in the present invention as lithium-alloying nanoparticles 200 that have not yet alloyed with lithium or have de-alloyed from lithium. Without being bound by theory, the present inventors believe that upon alloying with lithium, the lithium-alloying nanoparticles 200 expand two to five times their size when in the unlithiated state.

Volume expansion of spherical lithium-alloying particles 200 is proportional to the radius of the particle cubed. Thus primary lithium-alloying nanoparticles 200 minimize overall volume expansion. For the purposes of this invention the term "primary particles" refers to individual lithium-alloying nanoparticles 200. Furthermore, secondary lithium-alloying nanoparticles (not shown) may be enclosed within the anode material 10, wherein "secondary particles" refers to an agglomeration of primary particles 200. Thus, lithium-alloying nanoparticles 200 can include primary lithium-alloying nanoparticles and/or secondary lithium-alloying particles.

The lithium-alloying particles 200 are preferably nano-dispersed and homogeneously admixed with the active support matrix nanoparticles 100. The anode material nanoparticles have at least one matrix nanoparticle 100 or lithium-alloying particle 200 with a mean linear dimension between 1 and 999 nm. For the purposes of this invention the term "mean linear dimension" refers to an average of three orthogonal axes, for example X, Y and Z axes, representing three dimensions of the particle. Preferably the anode material nanoparticles have at least one matrix nanoparticle 100 or lithium-alloying particle 200 with a mean linear dimension between 2 and 500 nm. Even yet more preferred, the nanoparticles at least one matrix nanoparticle 100 or lithium-alloying particle 200 with a mean linear dimension of between 2 and 50 nm. And even yet more preferred, the material nanoparticles at least one matrix nanoparticle 100 or lithium-alloying particle 200 with a mean linear dimension of between 2 and 20 nm.

The anode material 10 is typically porous, preferably with a void volume of between 5 and 80% afforded by porosity 300. More preferably the void volume is between 10 and 50%. The porosity 300 between the anode material nanoparticles is preferably in the form of porosity channels that exist between adjacent material nanoparticles and allows for the diffusion of lithium ions to pass therethrough. The porosity 300 aids in accommodating volume expansion of the lithium-alloying nanoparticles 200 during charging when the lithium-alloying nanoparticles 200 alloy with lithium to form lithiated lithium-alloyed nanoparticles.

Figure 2:
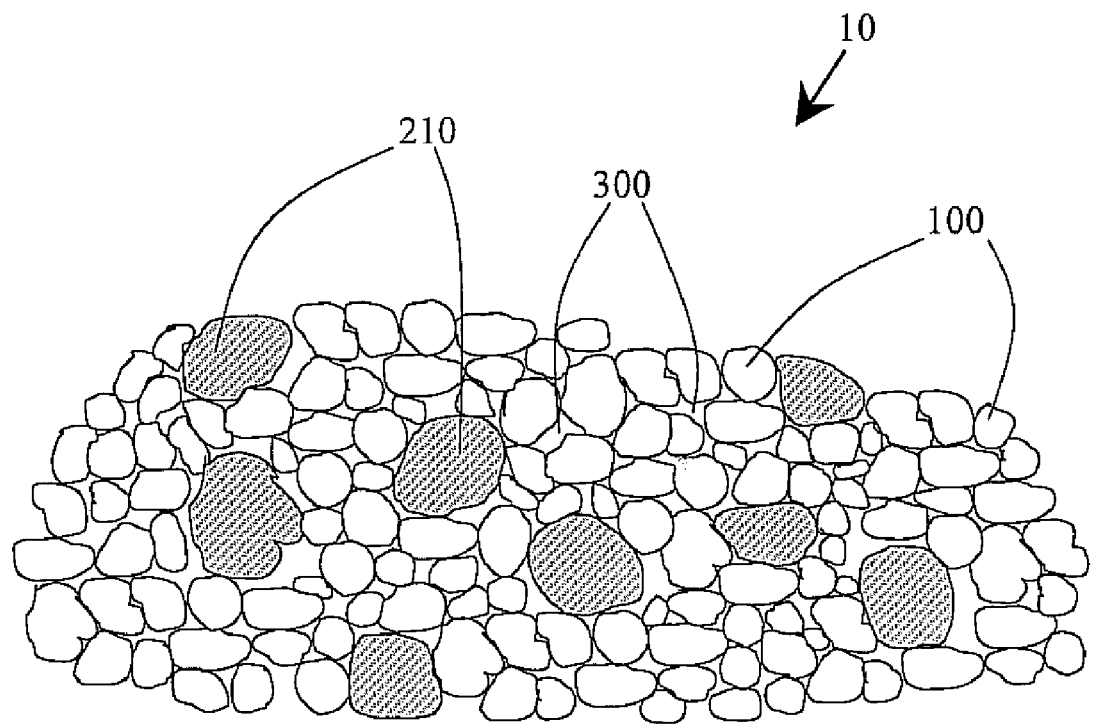
FIG. 2 illustrates an anode material in accordance with the first embodiment of the present invention.

Upon discharging of a battery using the anode material 10 of the present invention, lithium de-alloys from the lithiated nanoparticles. Although the present invention described thus far illustrates an anode material 10 initially manufactured with lithium-alloying nanoparticles 200 homogeneously admixed with active support matrix nanoparticles 100 (FIG. 1), the anode material 10 can be initially manufactured with lithiated nanoparticles 210, also known as pre-lithiated nanoparticles, homogeneously admixed with active support matrix nanoparticles 100 as shown in FIG. 2. In the alternative, the active support matrix nanoparticles 100 can be pre-lithiated and admixed with un-lithiated lithium-alloying nanoparticles 200, or pre-lithiated active support matrix nanoparticles 100 can be admixed with pre-lithiated lithium-alloying nanoparticles 210.

Figure 3:
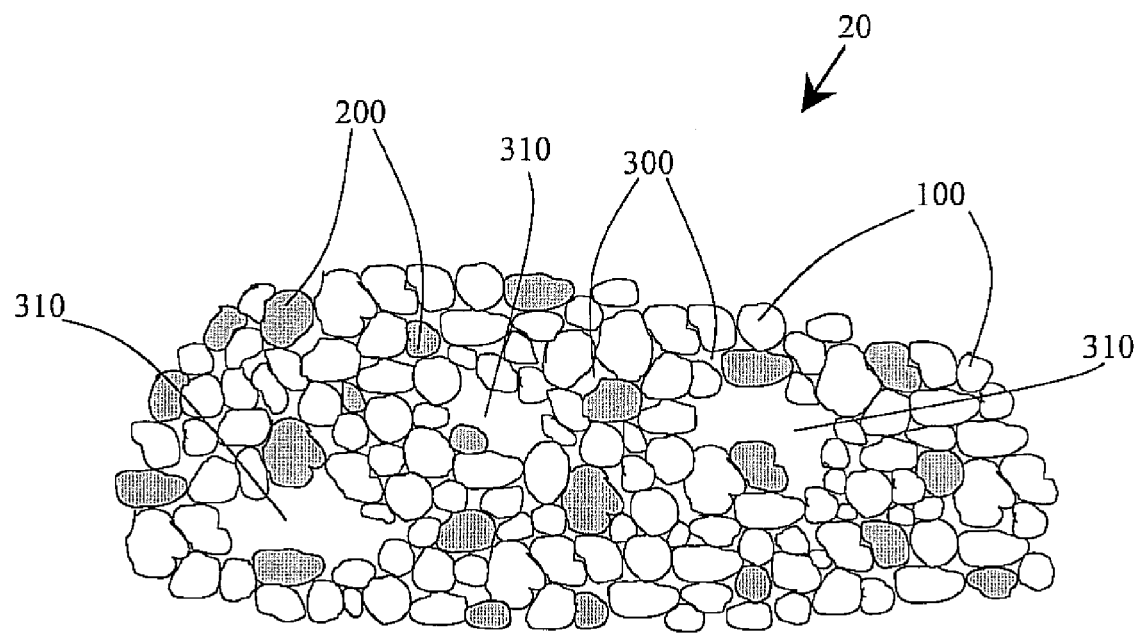
FIG. 3 illustrates an anode material in accordance with a second embodiment of the present invention.

In a second embodiment of the present invention, an anode material 20 in an uncharged state preferably includes porosity 300, preferably in the form of porosity channels, and at least one lithium-alloying nanoparticle 200 contained within an expansion accommodation pore 310 as taught in U.S. patent application Ser. No. 11/463,394 and shown generally in FIG. 3. Preferably the lithium-alloying nanoparticles 200 have the same size range and characteristics as the lithium alloying nanoparticles in the first embodiment of the present invention discussed above.

In reference to the second embodiment, a lithium-alloying nanoparticle 200 with a mean linear dimension between 1 and 999 nm preferably has an expansion accommodation pore 310 with a mean linear dimension between 2 nm and 5 microns (μm). More preferably a lithium-alloying nanoparticle 200 with a mean linear dimension between 2 and 500 nm has an expansion accommodation pore 310 with a mean linear dimension between 4 nm and 2.5 μm. Even yet more preferred, a lithium-alloying nanoparticle 200 with a mean linear dimension between 2 and 50 nm has an expansion accommodation pores 310 with a mean linear dimension of between 4 and 250 nm. And even yet more preferred, a lithium-alloying nanoparticle 200 with a mean linear dimension between 2 and 20 nm has an expansion accommodation pore 310 with a mean linear dimension of between 4 and 100 nm.

The mean linear dimension of the expansion accommodations pores 310 is preferably 2 to 5 times the mean linear dimension of the lithium-alloying nanoparticles 200. More preferably, the mean linear dimension of the expansion accommodations pores 310 is preferably 2 to 4 times the mean linear dimension of the lithium-alloying particles 200. Most preferably, the mean linear dimension of the expansion accommodations pores 310 is preferably 2 to 3 times the mean linear dimension of the lithium-alloying particles 200.

Although the second embodiment described thus far illustrates an anode material 20 initially manufactured with unlithiated lithium-alloying particles 200 homogeneously admixed with active matrix nanoparticles 100 and contained within expansion accommodation pores 340, the anode material 20 can be initially manufactured with lithiated lithium-alloying particles.

The anode material 20 can be highly porous, preferably with a void space of between 5 and 80% afforded by porosity 300 and expansion accommodation pores 310 contained therein. More preferably the void space is between 10 and 50%.

As an alternative to the incorporation of nanosized lithium-alloying nanoparticles 200 within the anode material 10 or 20 upon initial processing, lithium-alloying halides illustratively including $SnCl_2$, can be incorporated within the material 10 or 20 and subsequently reduced to elemental nanoparticles at relatively low temperatures, for example room temperature. The production of lithium-alloying nanoparticles 200 using this method can afford nanoparticles with a mean linear dimension between 2 and 100 nanometers. In addition, the lithium-alloying nanoparticles 200 can be homogeneously admixed with the active support matrix nanoparticles 100 by any physical, chemical or physiochemical method using a single or multi-step procedure. The physical method can be comprised of ball milling or other physically mixing technologies. The chemical method can be comprised of chemical reactions under a controlled temperature program, controlled atmospheres and combinations thereof. The physiochemical method can be comprised of chemical vapor deposition (CVD) processes. In the alternative a combination of the chemical, physical and physiochemical methods may be used. In addition, the active support matrix nanoparticles 100 may be formed independently of the lithium-alloying nanoparticles 200 or synthesized in situ with the particles.

Figure 4:
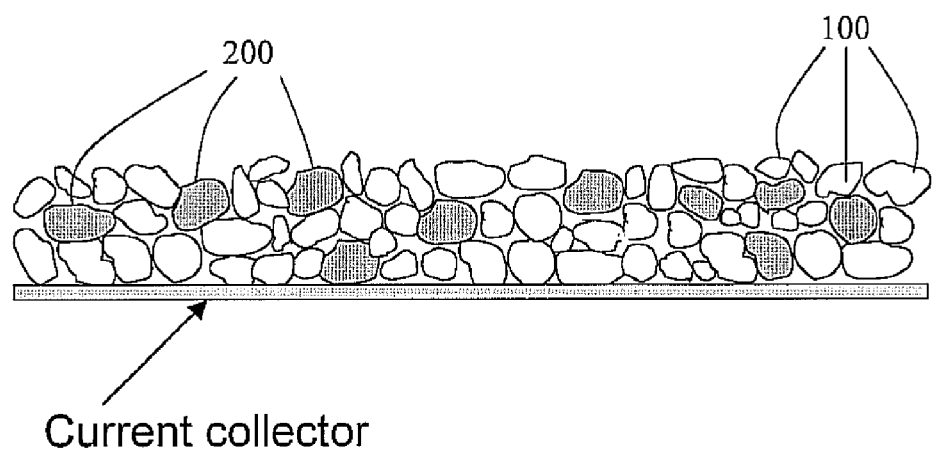
FIG. 4 illustrates an anode material in accordance with a first embodiment of the present invention placed on a current collector.

To afford an electrode from the anode material 10 or 20, the anode material nanoparticles are bound together within an electrode matrix using methods and processes known to those skilled in the art, for example using a binding element and placed on a current collector as shown in FIG. 4. The binding element preferably includes an adhesion promoter. The electrode may include additional elements to promote electronic conduction, ionic conduction and/or adhesion. For illustrative purposes only, the material nanoparticles can be encapsulated within the electrode matrix, entangled within the electrode matrix, chemically bonded with the electrode matrix and any combination thereof. In this manner the anode material of the present invention affords an improved rechargeable lithium battery. Although not shown in the figures nor described in the present invention, the battery using the above-described high performance anode material will also include an electrolyte, a cathode and a separator. The electrolyte can be a liquid, gel or solid, and may include a lithium salt.

For illustrative purposes only, an example regarding the formation and performance of the present invention is provided.

EXAMPLE 1

High surface area cobalt oxide ($Co_3O_4$) nanoparticles were produced by decomposing cobalt carbonate at 800° C. for 8 hours. The $Co_3O_4$ nanoparticles were then placed in a solution of ethanol containing $SnCl_2$, resulting in the absorption of $Sn^{2+}$ ions on the surface of the $Co_3O_4$ nanoparticles. A low temperature reduction of the $Sn^{2+}$ ions followed by filtering and rinsing produced a mixture of Sn and $Co_3O_4$ nanoparticles.

Figure 5:
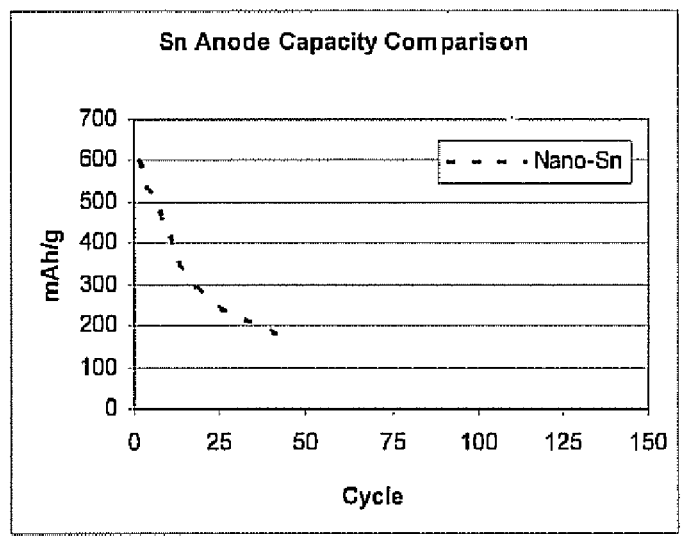
FIG. 5 illustrates the anode capacity for Sn nano-sized particles.
Figure 6:
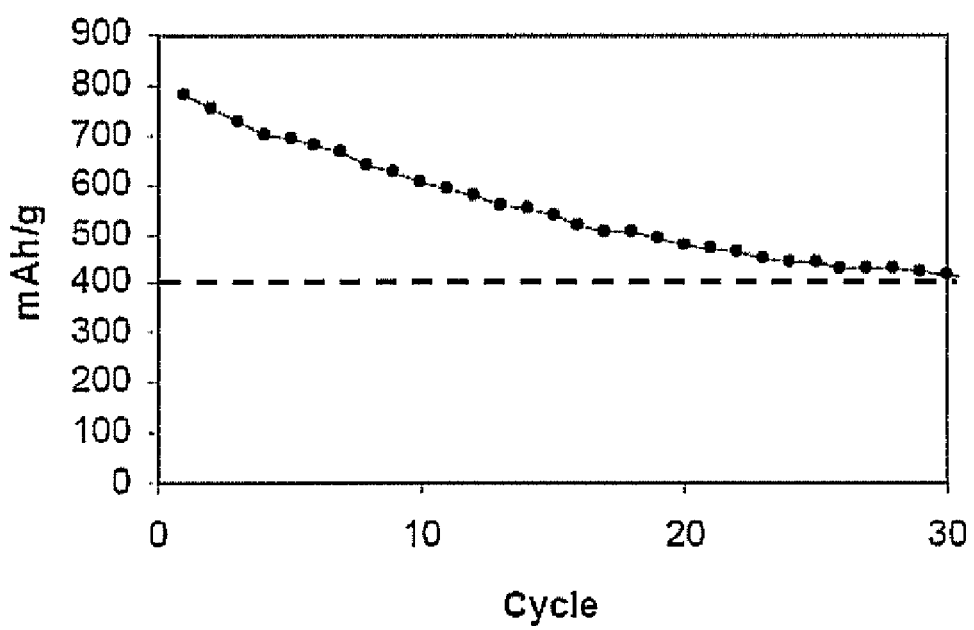
FIG. 6 illustrates the anode capacity for Sn and $Co_3O_4$ nano-sized particles of the active support matrix.

The anode capacity of an electrode formed from a homogenous mixture of the Sn and $Co_3O_4$ nanoparticles was compared to an electrode made from Sn nanoparticles only. FIG. 5 shows a plot of the anode capacity for the Sn nanoparticles anode. As shown in this figure, the capacity of the material is reduced to 200 mAh/g of anode material after approximately 30 cycles. In contrast, FIG. 6 shows a plot of the anode capacity for the Sn and $Co_3O_4$ nanoparticles anode wherein after 30 cycles the anode capacity is still above 400 mAh/g of anode material. Thus a factor of two increase in performance is provided by an anode material made in accordance with the present invention when compared to an anode made from Sn nanoparticles alone.

The invention is not restricted to the illustrative examples described above. The examples are not intended as a limitation on the scope of invention. Methods, apparatus, compositions and the like described herein are exemplary and not intended as a limitation on the scope of the invention. Changes therein and other uses will occur to those skilled in the art. The scope of the invention is defined by the scope of the claims.

The invention claimed is:

1. An anode material in a lithium battery comprising: a plurality of electrochemically active non-lithiated support nanoparticles, said active non-lithiated support nanoparticles undergoing a conversion reaction upon lithiation; and a plurality of lithium-alloying nanoparticles, said lithium-alloying nanoparticles being homogenously admixed with said active non-lithiated support nanoparticles to form an anode active material for a lithium battery.

2. The invention of claim 1, wherein said lithium-alloying nanoparticles are unlithiated nanoparticles.

3. The invention of claim 1, wherein said lithium-alloying nanoparticles are lithiated nanoparticles.

4. The invention of claim 1, wherein said active nanoparticles include a transition metal.

5. The invention of claim 4, wherein said transition metal is selected from the group consisting of cobalt, copper, iron, nickel, manganese and combinations thereof.

6. The invention of claim 1, wherein at least one of said plurality of active nanoparticles has a mean linear dimension of less than 200 nanometers.

7. The invention of claim 1, wherein said active nanoparticles are selected from the group consisting of a metal-oxide, metal-nitride, metal-sulfide, metal-fluoride, metal-phosphide and combinations thereof.

8. The invention of claim 7, wherein said active nanoparticles are selected from the group consisting of $Co_3O_4$, CuO, $FeF_3$, $Cu_3N$, $Ge_3N_4$ and combinations thereof.

9. The invention of claim 1, wherein said lithium-alloying nanoparticles have a composition selected from the group consisting of: tin, silicon, germanium, lead, antimony, aluminum, tin alloys and silicon alloys.

10. The invention of claim 1, wherein at least one of said plurality of active nanoparticles and plurality of lithium-alloying nanoparticles has a mean linear dimension of between 1 and 999 nanometers.

11. The invention of claim 1, wherein at least one of said plurality of active nanoparticles and plurality of lithium-alloying nanoparticles has a mean linear dimension of between 2 and 500 nanometers.

12. The invention of claim 1, wherein at least one of said plurality of active nanoparticles and plurality of lithium-alloying nanoparticles has a mean linear dimension of between 2 and 50 nanometers.

13. The invention of claim 1, wherein at least one of said plurality of active nanoparticles and plurality of lithium-alloying nanoparticles has a mean linear dimension of between 2 and 20 nanometers.

14. The invention of claim 1, wherein said anode active material further comprises an additive, said additive selected from the group consisting of a binding element, a conductivity enhancer, an ionic conductivity enhancer, an adhesion promoter and combinations thereof, for the purpose of forming an anode.

15. The invention of claim 14, wherein said anode active material and said additive are used to form an anode, said anode combined with a cathode, a separator and an electrolyte to form a battery.

16. An anode material in a lithium battery comprising:
 a plurality of electrochemically non-lithiated active support nanoparticles;
 a plurality of lithium-alloying nanoparticles, said lithium-alloying nanoparticles being homogenously admixed with said non-lithiated active support nanoparticles to form an anode active material; and
 said anode active material defining a void volume.

17. The invention of claim 16, wherein said void volume is comprised of a plurality of porosity channels.

18. The invention of claim 16, wherein said void volume is comprised of a plurality of expansion accommodation pores.

19. The invention of claim 16, wherein said void volume is comprised of a plurality of porosity channels and a plurality of expansion accommodation pores.

20. The invention of claim 19, wherein at least one of said plurality of expansion accommodation pores contains at least one lithium-alloying nanoparticle therein.

21. The invention of claim 19 wherein the mean linear dimension of said expansion accommodation pores are 2 to 5 times the mean linear dimension of an unlithiated lithium-alloying nanoparticle.

22. The invention of claim 19 wherein the mean linear dimension of said expansion accommodation pores are 2 to 4 times the mean linear dimension of an unlithiated nanoparticle.

23. The invention of claim 19 wherein the mean linear dimension of said expansion accommodation pores are 2 to 3 times the mean linear dimension of an unlithiated lithium-alloying nanoparticle.

24. The invention of claim 16, wherein said anode active material further comprises an additive, said additive selected from the group consisting of a binding element, a conductivity enhancer, an ionic conductivity enhancer, an adhesion promoter and combinations thereof, for the purpose of forming an anode.

25. The invention of claim 19, wherein said anode material and said additive are used to form an anode, said anode combined with a cathode, a separator and an electrolyte to form a battery.

* * * * *